Sept. 4, 1973 O. W. WILSON 3,756,863
PROCESS FOR MANUFACTURING MERCURY-DOPED GERMANIUM INFRARED PHOTOCONDUCTIVE DETECTOR
Original Filed Feb. 27, 1964
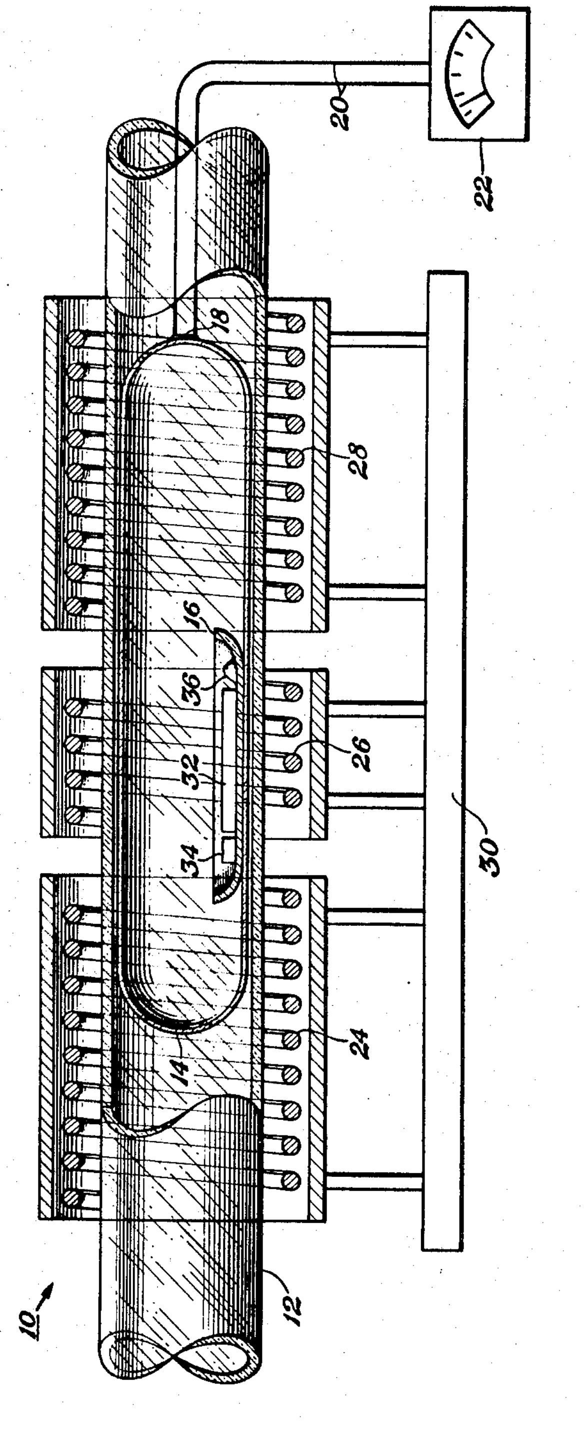
INVENTOR.
Oran W. Wilson.
BY
Gary C. Honeycutt United States Patent Office 3,756,863
Patented Sept. 4, 1973

3,756,863
PROCESS FOR MANUFACTURING MERCURY-DOPED GERMANIUM INFRARED PHOTOCONDUCTIVE DETECTOR

Oran W. Wilson, Richardson, Tex., assignor to Texas Instruments Incorporated, Dallas, Tex.

Application Oct. 23, 1968, Ser. No. 770,897, now Patent No. 3,674,712, which is a continuation of application Ser. No. 672,399, Oct. 2, 1967, which in turn is a continuation of application Ser. No. 347,905, Feb. 27, 1964, both now abandoned. Divided and this application Apr. 30, 1970, Ser. No. 33,507
Int. Cl. B01j *17/02;* H01l *3/12, 7/42*
U.S. Cl. 148—1.6 19 Claims

ABSTRACT OF THE DISCLOSURE

A process is disclosed for manufacturing mercury-doped germanium photoconductor material having a short time constant at liquid neon temperatures. The process includes refining the germanium by a number of molten zone-refining passes to reduce the impurities which act as shallow acceptors to a level on the order of $10^{12}$ atoms/cm.$^3$ or less and then compensating the remaining shallow acceptors with shallow donors such as antimony or arsenic and then doping the germanium with mercury from the vapor state to a level on the order of $10^{14}$ atoms/cm.$^3$ or greater.

This is a divisional application of copending application Ser. No. 770,897, filed Oct. 23, 1968, now U.S. Patent No. 3,674,712 which is a continuation of copending application Ser. No. 672,399, filed Oct. 2, 1967 (now abandoned), which was a continuation of copending application Ser. No. 347,905, filed Feb. 27, 1964 (now abandoned).

The present invention relates to photoconductive infrared detectors, and more particularly, but not by way of limitation, relates to a process for manufacuring mercury-doped germanium having a relatively short time-constant at temperatures which can be obtained by liquid neon, and to the semiconductor material resulting from the process.

Mercury-doped germanium has been suggested for use as an infrared detector material in various airborne all-weather mapping and surveillance devices. However, the mercury-doped germanium presently available must be maintained at very low temperatures in order to function as an infrared detector. The theoretical maximum temperature at which the mercury-doped germanium can be used for this purpose is 40° K., but nearly all previous applications have been at very low temperatures, for example in the liquid helium range. Since liquid helium is extremely difficult to handle in any circumstance, and in particular does not readily lend itself to airborne applications, attempts have been made to use mercury-doped germanium at liquid neon temperatures in the range of 27–32° K. because liquid neon is much easier to handle. But at these higher temperatures, mercury-doped germanium semiconductor materials heretofore available exhibit a long time-constant, and in particular, a long decay period. In other words, if the detector material is subjected to a square infrared pulse, the resulting conductivity of the material is not a square wave as required, but has an unacceptably long decay tail. For most applications, the detector material must have a time-constant of less than one micro-second. I have discovered that the long time-constant is caused by relatively high concentration of copper and other shallow acceptors of Group III which are nearly always present in chemically-refined germanium. Copper, in particular, very readily diffuses into and contaminates liquids or solids, particularly at higher temperatures. Although small in quantity, the copper impurities diffusing into the mercury-doped germanium during its manufacture, even the small quantities which may be traced back to the extrusion dies used to make parts of the doping apparatus, are sufficient to contaminate the germanium to such a level as to produce undesirably long time-constants. These acceptor impurities can be compensated to reduce the time-constant, but then the impedance increases to an unacceptable level and detectivity falls off sharply.

I have also discovered that photoconductive infrared detector material having an acceptably short time-constant at temperatures in the 27–32° K. range can be produced without loss of any other necessary or desired characteristics by starting with chemically-refined germanium, further refining the germanium by a number of molten zone-refining passes to reduce the impurities which act as shallow acceptors to a level on the order of $10^{12}$ atoms/cm.$^3$ or less, compensating the remaining shallow acceptors with shallow donors such as antimony or arsenic, and then doping the germanium with mercury from the vapor state using steps to insure that the germanium is not again contaminated by copper or the other shallow acceptor impurities.

The resulting semiconductor material is a single crystal of substantially pure germanium doped with mercury to a level on the order of from $1\times10^{14}$ to $3\times10^{15}$ and having on the order of or less than $10^{12}$ atoms/cm.$^3$ of shallow acceptors such as copper and Group III elements which have been compensated by antimony or arsenic to a level on the order of $10^{13}$ atoms/cm.$^3$.

More specifically, the process of the present invention entails further refining a chemically-refined germanium bar by passing a molten zone along the bar a plurality of times in the same direction while maintaining a single crystal to reduce the copper and other shallow acceptor impurities as much as practical by this process; adding a compensating shallow donor, such as antimony or arsenic, to the crystal during the last zone-refining pass to compensate the remaining copper; thoroughly cleaning the surface of the germanium bar by etching the surface of the bar; placing the bar and a single crystal mercury-doped germanium seed in a sandblasted synthetic quartz boat, the surface of which has been etched, leached and thoroughly rinsed to remove any copper which may have contaminated the surface of the boat during or after its manufacture; placing the boat in a quartz bomb-tube, the interior surface of which has been similarly etched, leached and rinsed to remove any copper embedded in the surface thereof; placing substantially pure mercury in the bomb-tube in an excess quantity sufficient to fill the bomb-tube with vapor and still maintain a condensed pool of mercury; drawing a vacuum on the bomb-tube and sealing the tube; heating the tube to a temperature less than the melting point of the germanium to vaporize the mercury and establish a mercury vapor pressure within the bomb; and passing a molten zone from the seed through the bar to produce a single crystal germanium bar doped with mercury to a level determined by the mercury vapor pressure within the bomb.

Therefore, an important object of the present invention is to provide mercury-doped germanium suitable for use as a photoconductive infrared detector at temperatures obtainable by liquid neon.

Another object of this invention is to provide a mercury-doped germanium infrared detector having a time-constant less than one micro-second at temperatures at least as high as 32° K.

Still another important object of the present invention is to provide a process for manufacturing mercury-doped germanium of the type described.

Additional objects and advantages of the present invention will be evident to those skilled in the art from the following detailed description and drawing, wherein:

The figure is a schematic diagram of a horizontal zone-refining apparatus which may be used to carry out the process of the present invention.

Referring now to the drawing, a standard horizontal zone-refining apparatus of the type using a sealed bomb-tube is indicated generally by the reference numeral 10. The apparatus 10 comprises a stationary quartz support tube 12 which is sized to receive a sealed quartz bomb-tube 14 in which is located a quartz boat 16, both of which will hereafter be described in greater detail. A suitable temperature-sensing means 18, such as a thermocouple, is attached to one end of the bomb-tube 14 and is connected by electrical leads 20 to a suitable temperature indicator 22. Three resistive heating coils 24, 26 and 28 are disposed around the support tube 12. The coils 24, 26 and 28 may be well-insulated resistive wire heaters. Alloy K wire is suitable for this purpose. The outer coils 24 and 28 are used to maintain the bomb-tube 14 at a temperature below the melting point of germanium. The center heater 26 is used to establish a molten zone in a germanium bar. The coils are supported by a gear-driven platform 30, which may be propelled at a very slow rate along the support tube 12 so that the molten zone established by the center heating coil 26 may be passed through the germanium bar disposed in the boat 16 for purposes which will hereafter be described in detail.

The starting material for the process of the present invention is a high quality, chemically-refined germanium. The chemically-refined germanium is further refined by passing a molten zone from one end of the bar to the other a number of times. Any suitable zone-refining apparatus may be used for this purpose. A single crystal seed is used at the start of the first zone-refining pass to establish a single crystal and the single crystal is maintained during all subsequent passes. The molten zone is preferably passed through the germanium bar from 5 to 10 times. During these passes, all significant impurities will be removed from the germanium except very small amounts of copper which act as shallow acceptors at the 0.04 ev. level and some much smaller amounts of shallow acceptors from Group III. These impurities cannot be materially reduced by further zone-refining, or by any other feasible process, and will be on the order of, or less than, $10^{12}$ atoms/cm.$^3$.

The copper is then precisely compensated by adding the necessary quantity of a shallow donor impurity, either antimony or arsenic to the molten zone of the germanium bar during the last zone-refining pass. It has been found that 19 milligrams of 0.5% antimony-doping compound added to a 22 cc. molten zone results in the proper level of antimony, on the order of $10^{13}$ atoms/cm.$^3$, to compensate for the remaining copper. After the germanium has been zone-refined to reduce the amount of copper impurities in the germanium to a minimum and then the copper impurities compensated with antimony, the germanium crystal should have electrical data within the approximate ranges set forth in Table I below.

TABLE I

Electrical data at 300° K.:
- $\rho$—$3\times10^1$–$4\times10^1$ ohm-cm.
- $\mu$—$1.5\times10^3$–$2.5\times10^3$ cm.$^2$/volt-sec.
- N—$7\times10^{13}$–$1\times10^{14}$ atoms/cm.$^3$ Electrical data at 77° K.:
- $\rho$—$5\times10^0$–$7\times10^0$ ohm-cm.
- $\mu$—$2\times10^4$–$3.8\times10^4$ cm./volt-sec.
- N—$3\times10^{13}$–$8\times10^{13}$ atoms/cm.$^3$ A bar of the zone-refined and compensated germanium crystal is then cut with a diamond saw to a size which can be placed in the boat 16 with a seed in place. A suitable single crystal seed is preferably obtained from a mercury-doped germanium crystal which has previously been manufactured in accordance with the process of the present invention and which has been tested as a photoconductive infrared detector and has been found to have an acceptably short time-constant. When such a seed is not available, a single crystal seed of the highest purity mercury-doped or undoped germanium available may be used on any orientation except [111].

The mercury-doped germanium seed and compensated germanium bar are degreased with trichloroethylene followed by a methyl alcohol rinse, then etched in CP–4 solution for 20–30 seconds. The CP–4 solution is a mixture comprised of 25% acetic acid, 25% hydrofluoric acid, and 50% a solution of nitric acid and bromine. The nitric acid-bromine solution is comprised of about 10–15 drops of bromine in 250 cc. of nitric acid and should not be mixed with the acetic and hydrofluoric acids until just before the CP–4 is to be used. The CP–4 solution etches away the surface layer of the seed and germanium bar and thereby insures that any copper which may have contaminated the surface of the materials as the crystals were cut to the desired shape will be removed. The bar and seed are then rinsed in 16 meg-ohm or better water. Next, the germanium seed crystal and germanium bar are soaked in a 50% solution of hydrochloric acid and water for about ten minutes to further remove any copper which may have been left by the CP–4 solution on the surface of the crystals, then rinsed with 16 meg-ohm or better water and allowed to dry between two sheets of bibulous paper.

The composition of the bomb-tube 14 and boat 16 and the preparation of these parts of the process apparatus is very important because each must be a high purity material free from the customary traces of copper which can be found in almost all manufactured products as a result of diffusion from extrusion dyes and other manufacturing equipment. The bomb-tube 14 may be a standard G.E. clear fused quartz bomb-tube having a 22 mm. ID with walls 2 mm. thick. These bomb-tubes are 20 inches long and domed off at one end prior to being loaded and sealed off under vacuum as will presently be described. The boat 16 should be a clear fused synthetic quartz boat. An example of a suitable boat is one sold by Thermal American Quartz Company of Montville, N.J., under the trademark "Spectroseal," or an equivalent. These boats are manufactured in such a manner as to exclude detectable traces of copper and these boats have been successfully used to carry out the process of the present invention.

The inside surface of the boat 16 is sandblasted to prevent wetting by molten germanium so that a single crystal can be formed as the molten zone is passed through the bar. The boat 16 and the bomb-tube 14 are thoroughly degreased with trichloroethylene followed by a methyl alcohol rinse. Then the boat and bomb-tube are soaked in full strength hydrofluoric acid for ten minutes to etch away the surface layer of the quartz material and remove any traces of copper which may have wiped off on the parts during manufacturing, handling, or shipping, then rinsed in 16 meg-ohm or better water. Next the bomb-tube and boat are soaked in strong sodium hydroxide solution for 30 minutes to leach the surface of the parts and further remove any copper impurities adjacent the surface of the parts, then again rinsed in 16 meg-ohm or better water. Next the bomb-tube and boat are soaked in full strength hydrochloric acid for 30 minutes to further insure that all residual sodium hydroxide and copper solution is removed, and again rinsed in 16 meg-ohm or better water. The boat is then allowed to dry between two sheets of bibulous paper. The bomb-tube is hung with the open end down and excess water drained from within the tube. No further drying of the tube is necessary or should be attempted because to do so would likely result in contamination of the interior of the bomb-tube.

The compensated germanium bar 32, the single crystal seed 34, and about 2 grams of mercury 36 are placed in the boat 16 in the general positions indicated in the drawing. Only very high purity mercury should be used. New, triple-distilled mercury has been successfully used. The precise amount of mercury added to the bomb-tube is unimportant so long as an excess is available at the operating cold spot temperature of the bomb, as will be presently defined, to form a condensed pool after the bomb-tube is filled with mercury vapor. The bomb-tube 14 is then positioned horizontally and the boat 16 inserted with the seed 34 next to the back end of the bomb-tube. The open end of the bomb-tube 14 is then connected to a vacuum system and a vacuum pulled on the tube. A good mechanical vacuum pump with a cold trap is sufficient since the primary purpose is to reduce the pressure within the tube and remove substantially all of the volatile impurities, including the water, from within the bomb-tube. For example, a vacuum of about one micron of mercury has been found adequate. The bomb-tube is then sealed by heating the bomb-tube adjacent the open end and constricting the heated portion until a seal is accomplished. The vacuum should be maintained as the bomb-tube is sealed so that any impurities volatilized as a result of heating the bomb-tube will be withdrawn from the tube. The vacuum will also assist in collapsing and sealing the tube. The thermocouple 18 or other heat-sensing device is then placed against the end of the bomb-tube 14 and the bomb-tube inserted in the support tube 12 of the horizontal zone-refining apparatus 10.

The resistive heaters 24, 26 and 28 are then energized. The heater 28 is adjusted until the end of the bomb-tube 14 is at a temperature in excess of 500° C., but less than the melting point of the germanium, so that the temperature adjacent the thermocouple 18 will be the coldest spot on the bomb-tube 14, and will therefore control the vapor pressure of the mercury. As the bomb-tube is heated, the mercury in the boat 16 vaporizes and recondenses as a pool at the cold spot adjacent the thermocouple 18. A sufficient volume of mercury must be placed within the bomb-tube to always maintain a pool of condensed mercury at the cold spot. Unless a small pool of condensed mercury is visible on the end of the bomb-tube adjacent the thermocouple 18, either an insufficient quantity of mercury is present within the bomb-tube, or the bomb-tube 14 has another point which is at a lower temperature. The temperature of the pool of condensed mercury determines the vapor pressure of the mercury within the bomb-tube, which in turn determines the doping level of the mercury in the germanium. Therefore, it is very important that the point adjacent the thermocouple 18 be the coldest point of the bomb-tube and be maintained at the predetermined temperature which will produce the desired doping level. As will hereafter be pointed out in greater detail, the proper temperature can be determined empirically after a few runs.

The center heater 26 should be adjusted until the temperature of the germanium bar 38 adjacent the germanium seed crystal 34 exceeds 1000° C. so as to produce a molten zone between the seed and the bar. The extent to which the temperature exceeds the melting point will determine the width of the molten zone. After a molten zone has been established, the mercury vapor within the bomb-tube 14 will diffuse into the molten zone until an equilibrium concentration of mercury is established in the germanium, which will determine the ultimate concentration of mercury in the final germanium crystal. Since the equilibrium concentration is a function of the vapor pressure of the mercury and therefore is directly related to the temperature of the cold spot on the bomb-tube adjacent the thermocouple 18, the temperature of the cold spot determines the doping level. The molten zone is then carried through the length of the germanium bar 32 by moving the platform 30 and heaters 24, 26 and 28 relative to the bomb-tube and boat. Care should be taken to maintain the temperature of the cold spot on the bomb-tube 14 at predetermined level in order to maintain the vapor pressure of the mercury constant and thereby obtain a constant mercury doping level over the length of the germanium bar. After the molten zone has been carried through the germanium bar, the three heating elements 24, 26 and 28 are turned "off" and the bomb-tube 14 and the boat 16 should be allowed to cool under the heaters to prevent thermal fracture of the germanium crystal.

Mercury concentrations as high as about $2\times10^{15}$ atoms/cm.$^3$ have been obtained using the described process with a cold spot temperature of about 500° C., which results in a mercury vapor pressure of about nine atmospheres. Equipment which will handle higher pressures could be expected to yield higher mercury levels. By way of example, when undoped, zone-refined, antimony-compensated germanium having the electrical data set forth in Table II was doped with mercury using the process described above, mercury-doped germanium infrared detector material having the electrical characteristics set forth in Table III and a time-constant less than one micro-second at liquid neon temperature was obtained without loss of other desirable characteristics.

TABLE II.—ELECTRICAL DATA ON GERMANIUM

300° K.:
- $\rho$—$4.08\times10^1$ ohm-cm.
- $\mu$—$2.04\times10^3$ cm.$^2$/volt-sec.
- N—$7.52\times10^{13}$ atoms/cm.$^3$ 77° K.:
- $\rho$—$6.70\times10^0$ ohm-cm.
- $\mu$—$2.28\times10^4$ cm.$^2$/volt-sec.
- N—$4.08\times10^{13}$ atoms/cm.$^3$

TABLE III.—ELECTRICAL DATA ON MERCURY-DOPED GERMANIUM

300° K.:
- $\rho$—$1.02\times10^0$ ohm-cm.
- $\mu$—$2.9\times10^3$ cm.$^2$/volt-sec.
- P—$2.09\times10^{15}$ atoms/cm.$^3$ 77° K.:
- $\rho$—$3.61\times10^0$ ohm-cm.
- $\mu$—$3.63\times10^4$ cm.$^2$/volt-sec.
- P—$4.77\times10^{13}$ atoms/cm.$^3$ After the photoconductive detector material is molten zone-refined as described, the shallow acceptor impurities will be almost entirely copper and will be at a level less than about $1\times10^{13}$ atoms/cm.$^3$. If properly carried out, the copper can be reduced as low as $1\times10^{12}$ atoms/cm.$^3$, and the lower the copper level is reduced, the better the material will be suited for use as a photoconductive infrared detector. The copper and other shallow acceptor impurities should be compensated only to the extent required to insure that the compensating donor impurities will remain dominant over the acceptor impurities. This requires that the level of compensating donor impurities exceed the level of acceptor impurities by about one order of magnitude. However, the donor impurities must not approach the level of the mercury dopant and should be less than about $1\times10^{14}$ atoms/cm.$^3$.

Although the invention has been described in terms of a specific embodiment, it is to be understood that various changes, substitutions and alterations can be made therein without departing from the spirit and scope of the invention as defined by the appended claims.

What is claimed is:

1. A process for manufacturing mercury-doped germanium photoconductive detector material having a short time-constant at liquid neon temperatures comprising the steps of:

passing a molten zone from one end of a single crystal bar of chemically refined germanium to the other end while maintaining a single crystal, to reduce the copper impurities in the germanium to a level of $1\times10^{13}$ atoms/cm.$^3$ or less;

adding shallow donor impurities taken from the group consisting of antimony and arsenic to a level exceeding the level of copper impurities by about one order of magnitude to compensate the remaining copper impurities;

thoroughly cleaning the surface of the compensated germanium crystal bar to remove any copper impurities on or adjacent to the surface thereof;

cleaning the surface of a quartz boat and bomb-tube by etching and leaching to remove essentially all copper impurities on and adjacent to the surfaces thereof;

placing said bar and a single crystal mercury-doped germanium seed in said cleaned boat;

placing said bar, seed, boat and an excess quantity of substantially pure mercury in said cleaned bomb-tube, evacuating and sealing the bomb-tube, heating the bomb-tube to a temperature less than the melting point of germanium to vaporize a portion of the mercury in the bomb-tube and establish a mercury vapor pressure corresponding to the temperature of the coolest portion of the bomb-tube;

maintaining the coolest portion of the bomb-tube substantially at the predetermined temperature required to provide mercury doping to a level in excess of $10^{14}$ atoms/cm.$^3$;

establishing a molten zone between the bar and the seed, and passing the molten zone through the bar to produce a single crystal of mercury-doped germanium.

2. A process comprising the steps defined in claim 1 wherein: the surface of the compensated germanium crystal bar is thoroughly cleaned by etching the surface away.

3. A process comprising the steps defined in claim 2 wherein: the surface of the bar is etched by immersing the bar in CP–4 solution.

4. A process comprising the steps defined in claim 3 further characterized by the step of: soaking the bar in a hydrochloric acid solution after the etching step to assist in removing any residual copper solution.

5. A process comprising the steps defined in claim 1 wherein: the boat is fabricated from a high purity synthetic quartz.

6. A process comprising the steps defined in claim 5 wherein: the surface of the boat is etched by hydrofluoric acid and is leached by a sodium hydroxide solution.

7. A process comprising the steps defined in claim 5 wherein: the bomb-tube is fabricated from clear fused quartz.

8. A process comprising the steps defined in claim 7 wherein: the interior surface of the bomb-tube is etched by hydrofluoric acid and is leached by a sodium hydroxide solution.

9. A process comprising the steps defined in claim 1 wherein: a molten zone is passed through the germanium bar a plurality of times.

10. A process comprising the steps defined in claim 9 wherein: the shallow donor impurities are added to the last molten zone passed through the germanium bar during the molten zone-refining.

11. A process comprising the steps defined in claim 10 wherein: the shallow donor impurities added to the molten zone is comprised of about one milligram of 0.5% antimony doping compound per cc. of molten germanium.

12. A process comprising the steps defined in claim 1 wherein: the coolest portion of the bomb-tube is maintained at a temperature in excess of about 500° C.

13. A process comprising the steps defined in claim 1 wherein: the mercury added to the bomb-tube is new triple-distilled mercury.

14. A process for manufacturing mercury-doped germanium photoconductive detector material having a short time-constant at liquid neon temperatures comprising the steps of:

thoroughly cleaning the surface of a single crystal bar of germanium having less than about $1\times10^{13}$ atoms/cm.$^3$ of shallow acceptor impurities taken from the group consisting of copper and Group III elements compensated to a level in excess of said shallow acceptor impurities by about one order of magnitude by shallow donor impurities taken from the group consisting of antimony and arsenic, cleaning the surface of a quartz boat and bomb-tube by etching and leaching to remove essentially all copper impurities on and adjacent to the surfaces thereof;

placing said bar and a single crystal, mercury-doped germanium seed in said cleaned boat, evacuating and sealing said bomb-tube, heating said bomb-tube to a temperature less than the melting point of germanium to vaporize a portion of the mercury in said bomb-tube and establish a mercury vapor pressure corresponding to the temperature of the coolest portion of said bomb-tube, maintaining said coolest portion of said bomb-tube substantially a predetermined temperature, establishing a molten zone between said bar and said seed, and passing said molten zone through said bar to produce a single crystal of germanium doped with mercury to a level in excess of $10^{14}$ atoms/cm.$^3$.

15. A process as defined in claim 14 wherein: the boat is comprised of substantially pure clear fused synthetic quartz.

16. A process for manufacturing mercury-doped germanium photoconductive detector material having a short time-constant at liquid neon temperatures comprising the steps of:

passing a molten zone through a bar of chemically refined germanium five or more times while maintaining a single crystal structure thereby reducing copper impurities in the germanium to a level less than $1\times10^{13}$ atoms/cm.$^3$, adding an antimony-doping compound to a molten zone of the bar and passing the molten zone through the bar doping it with antimony to a level of between $1\times10^{13}$ and $1\times10^{14}$ atoms/cm.$^3$, thereby to compensate the copper impurities remaining in the germanium, degreasing the surfaces of the bar and a single crystal mercury-doped germanium seed with trichloroethylene followed by a methyl alcohol rinse, etching in CP-4 solution, rinsing in water, soaking in a solution of water and hydrochloric acid and rinsing in water, thereby thoroughly cleaning the surfaces thereof, soaking the surfaces of a substantially pure quartz boat and a substantially pure quartz bomb-tube in full strength hydrofluoric acid for about ten minutes, rinsing in water, soaking in strong sodium hydroxide solution for about thirty minutes, rinsing in water, soaking in full strength hydrochloric acid for about thirty minutes, and rinsing in water, thereby cleaning the surfaces thereof, placing the bar and the seed in the boat and placing the boat and an excess quantity of triple-distilled new mercury in the bomb-tube, drawing a vacuum on the bomb-tube and sealing the bomb-tube by heating and constricting the bomb-tube to seal the boat inside the bomb-tube, heating the bomb-tube to a temperature less than the melting point of germanium and maintaining the coolest portion of the bomb-tube at about 500° C. to maintain a predetermined mercury vapor pressure within the bomb-tube, and establishing a molten zone between the bar and the seed and passing the molten zone through the bar to produce a single crystal of germanium doped with mercury to a level in excess of $1\times10^{14}$ atoms/cm.$^3$.

17. A process for manufacturing mercury-doped germanium as set forth in claim 14 wherein mercury is added to a level in the range of $1\times10^{14}$ to $3\times10^{15}$ atoms/cm.$^3$.

18. A process for manufacturing mercury-doped germanium as set forth in claim 14 wherein said shallow donor is arsenic added to a level in the range of from $1\times10^{13}$ atoms/cm.$^3$ to $1\times10^{14}$ atoms/cm.$^3$.

19. A process for manufacturing mercury-doped germanium as set forth in claim 14 wherein said shallow donor is antimony added to a level in the range from $1\times10^{13}$ atoms/cm.$^3$ to $1\times10^{14}$ atoms/cm.$^3$.

References Cited

UNITED STATES PATENTS

| | | | |
|---|---|---|---|
| 2,739,088 | 3/1956 | Pfann | 148—1.5 |
| 2,844,737 | 7/1958 | Hahn et al. | 250—211 |
| 2,871,427 | 1/1959 | Tyler et al. | 317—235 N |

Pfann, W. G.: "Zone Meeting," textbook, John Wiley

| | | | |
|---|---|---|---|
| 3,275,557 | 9/1966 | Hughes | 252—62.3 |

OTHER REFERENCES

Pfann, W. G.: "Zone Melting," textbook, John Wiley & Sons Inc., N.Y., 1958, p. 100.

L. DEWAYNE RUTLEDGE, Primary Examiner

W. G. SABA, Assistant Examiner

U.S. Cl. X.R.

23—301; 148—171, 172, 173; 250—83.3 H, 211; 252—62.3 E, 501, 512; 317—235 R